US008195843B2

(12) United States Patent
Almeida et al.

(10) Patent No.: US 8,195,843 B2
(45) Date of Patent: Jun. 5, 2012

(54) HDMI CONTROLLER CIRCUIT FOR TRANSMITTING DIGITAL DATA TO COMPATIBLE AUDIO DEVICE USING ADDRESS DECODER WHERE VALUES ARE WRITTEN TO REGISTERS OF SUB-CIRCUITS

(75) Inventors: Rui Sergio Rainho Almeida, Maia (PT); Antonio Manuel Cunha Costa, Paredes de Coura (PT)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 12/898,631

(22) Filed: Oct. 5, 2010

(65) Prior Publication Data
US 2011/0019086 A1 Jan. 27, 2011

Related U.S. Application Data

(62) Division of application No. 11/967,936, filed on Dec. 31, 2007, now Pat. No. 7,818,466.

(51) Int. Cl.
*G06F 3/00* (2006.01)
(52) U.S. Cl. ............... 710/19; 710/14; 710/15; 710/16; 710/17; 710/18; 709/223; 709/224; 713/300; 713/310; 713/320; 348/554; 348/705; 348/725
(58) Field of Classification Search ............... 710/8–10, 710/65; 348/554, 705, 725
See application file for complete search history.

(56) References Cited

U.S. PATENT DOCUMENTS

| | | | |
|---|---|---|---|
| 7,315,201 B2 | 1/2008 | Marshall et al. | |
| 7,525,600 B2 | 4/2009 | Kaylani et al. | |
| 2005/0231493 A1 | 10/2005 | Takahashi et al. | |
| 2006/0001776 A1 | 1/2006 | Araki | |
| 2006/0095623 A1* | 5/2006 | Nio et al. | 710/260 |
| 2006/0256239 A1 | 11/2006 | Higashi | |
| 2006/0274563 A1 | 12/2006 | Stakely et al. | |
| 2007/0050063 A1* | 3/2007 | Tung et al. | 700/94 |
| 2007/0089157 A1 | 4/2007 | Clark | |
| 2007/0174523 A1 | 7/2007 | Lin et al. | |
| 2007/0253391 A1 | 11/2007 | Shao et al. | |
| 2008/0007616 A1 | 1/2008 | Baladhandayuthapani | |
| 2008/0072333 A1 | 3/2008 | Chen | |
| 2008/0111921 A1 | 5/2008 | Tung et al. | |
| 2008/0114605 A1 | 5/2008 | Wu et al. | |
| 2008/0165288 A1 | 7/2008 | Miller | |
| 2008/0165985 A1 | 7/2008 | Hsu et al. | |
| 2009/0022176 A1 | 1/2009 | Nguyen | |

* cited by examiner

*Primary Examiner* — Tammara Peyton
(74) *Attorney, Agent, or Firm* — Bever, Hoffman & Harms, LLP; Jeanette S. Harms

(57) ABSTRACT

The present invention provides a high definition media interface (HDMI) controller having a modular design internal bus structure, and applications thereof. The controller includes a circuit interface, an address decoder coupled to the circuit interface, a plurality of sub-circuits, wherein each sub-circuit includes registers used to configure and control the sub-circuit, and a bus that couples the registers of each sub-circuit to the address decoder. After startup of the controller, the sub-circuits are configured by using the circuit interface, address decoder, and bus to write values to the registers of the sub-circuits. The sub-circuits of the controller include a video pixel sampler, an audio sampler, a frame composer, and a power controller. The video sampler can be configured to convert one of a plurality of RGB and YCbCr signals to a common format signal used by other sub-circuits of the controller.

19 Claims, 13 Drawing Sheets

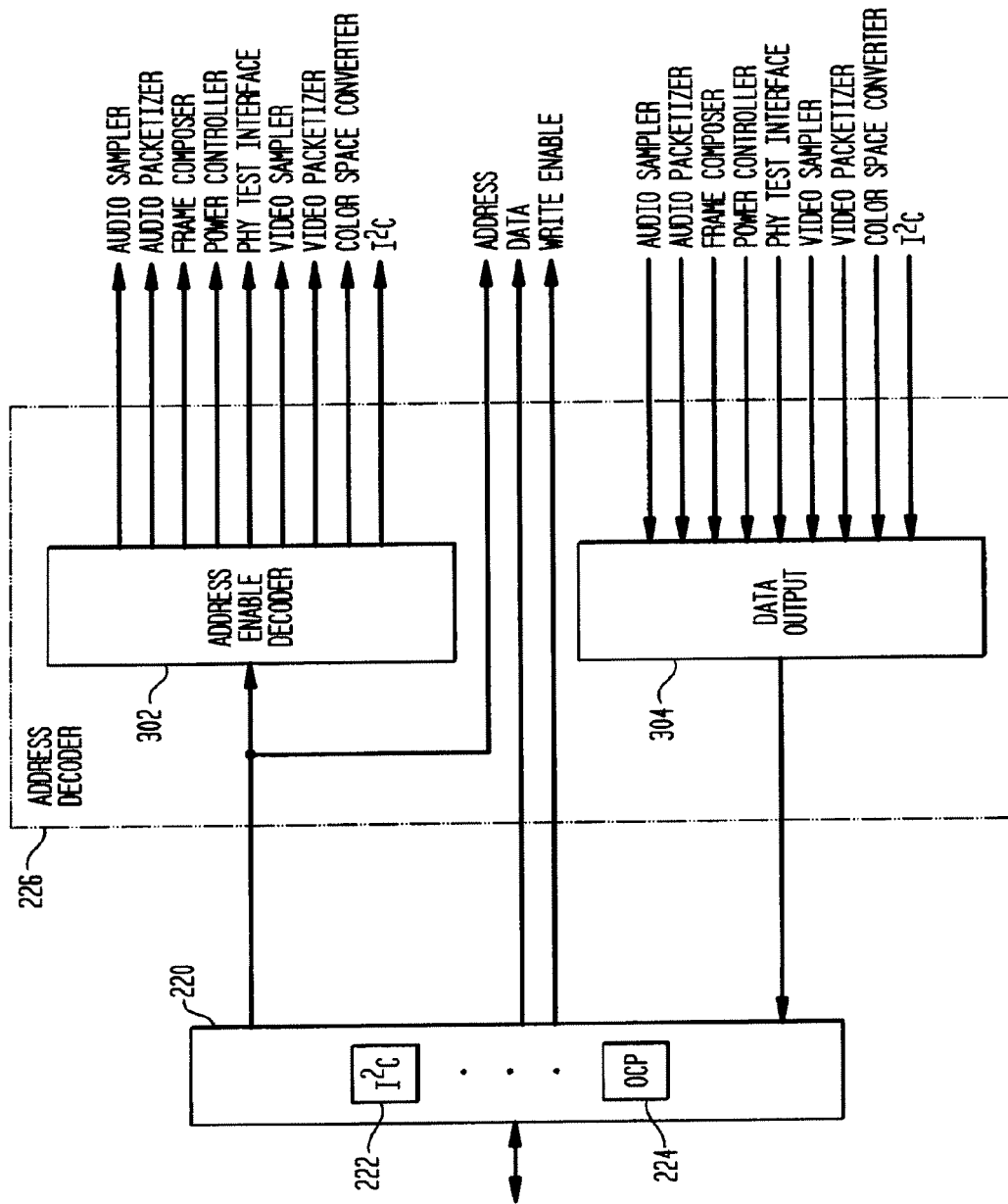

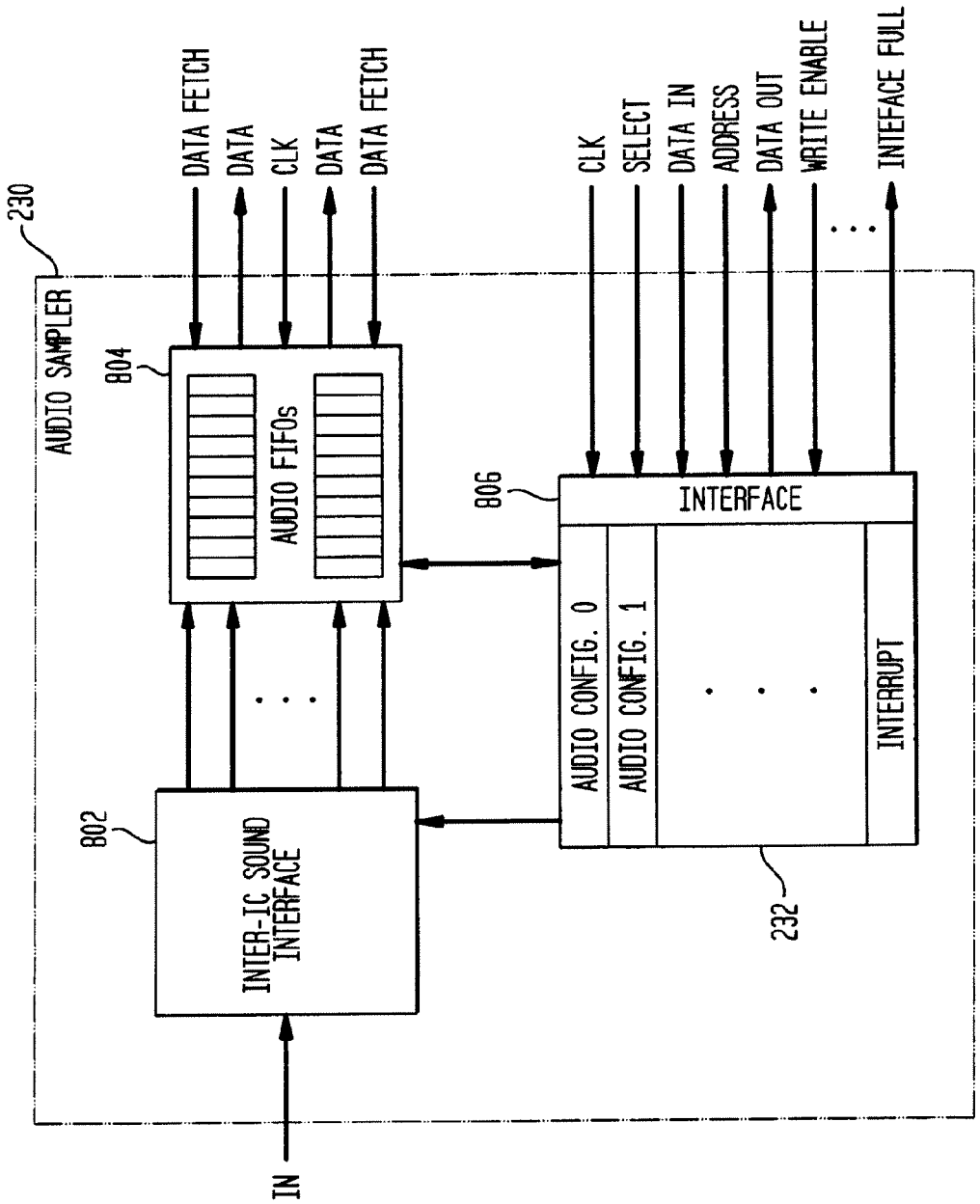

HDMI CONTROLLER CIRCUIT FOR TRANSMITTING DIGITAL DATA TO COMPATIBLE AUDIO DEVICE USING ADDRESS DECODER WHERE VALUES ARE WRITTEN TO REGISTERS OF SUB-CIRCUITS

RELATED APPLICATIONS

This application is a divisional of U.S. patent application Ser. No. 11/967,936, entitled "HDMI Controller Circuit For Transmitting Digital Data to Compatible Audio Device Using Address Decoder Where Values Are Written To Registers Of Sub-Circuits" filed Dec. 31, 2007.

FIELD OF THE PRESENT INVENTION

The present invention generally relates to electronic circuits. More particularly, it relates to a high definition media interface controller having a modular design internal bus structure, and applications thereof.

BACKGROUND OF THE PRESENT INVENTION

The High-Definition Multimedia Interface (HDMI) is an audio/video interface for transmitting digital data from a wide variety of devices such as a set-top box, a CD/DVD disc player, a personal computer, or a video game console to a compatible audio device and/or a compatible video device. Because these devices do not all use the same digital signal format, designing an HDMI compatible interface controller is a difficult and complex task. What is needed is an architecture that simplifies the design of an HDMI compatible interface controller and that enables the interface controller to be configured for use with a wide variety of digital devices.

BRIEF SUMMARY OF THE PRESENT INVENTION

The present invention provides a high definition media interface (HDMI) controller having a modular design internal bus structure, and applications thereof. In an embodiment, the HDMI controller includes a circuit interface, an address decoder coupled to the circuit interface, a plurality of sub-circuits, wherein each sub-circuit includes registers used to configure and control the sub-circuit, and a bus that couples the register of each sub-circuit to the address decoder. After startup of the controller, the sub-circuits are configured by using the circuit interface, address decoder, and bus to write values to the registers of the sub-circuits. In an embodiment, the sub-circuits of the controller include, for example, a video pixel sampler, an audio sampler, a frame composer, and a power controller. The video sampler can be configured to convert one of a plurality of video (e.g., RGB or YcbCr) signals to a common format signal used by other sub-circuits of the controller.

Further embodiments, features, and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the present invention and to enable a person skilled in the pertinent art to make and use the present invention.

FIG. 3 is a diagram of an example address decoder for the High-Definition Multimedia Interface transmitter controller of FIG. 2 according to an embodiment of the present invention.

Figure 2:
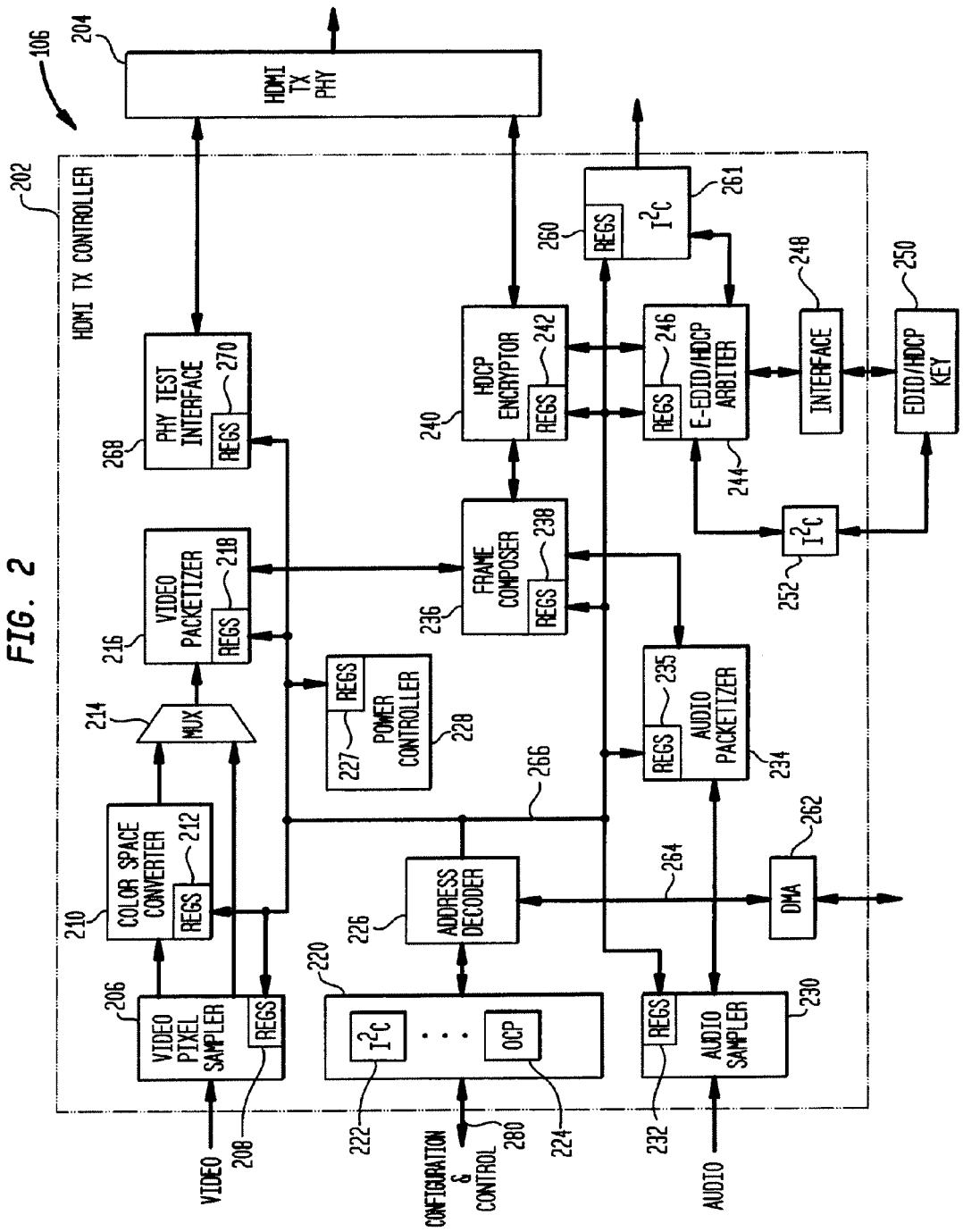
FIG. 2 is a diagram of an High-Definition Multimedia Interface transmitter controller according to an embodiment of the present invention.
Figure 8B:
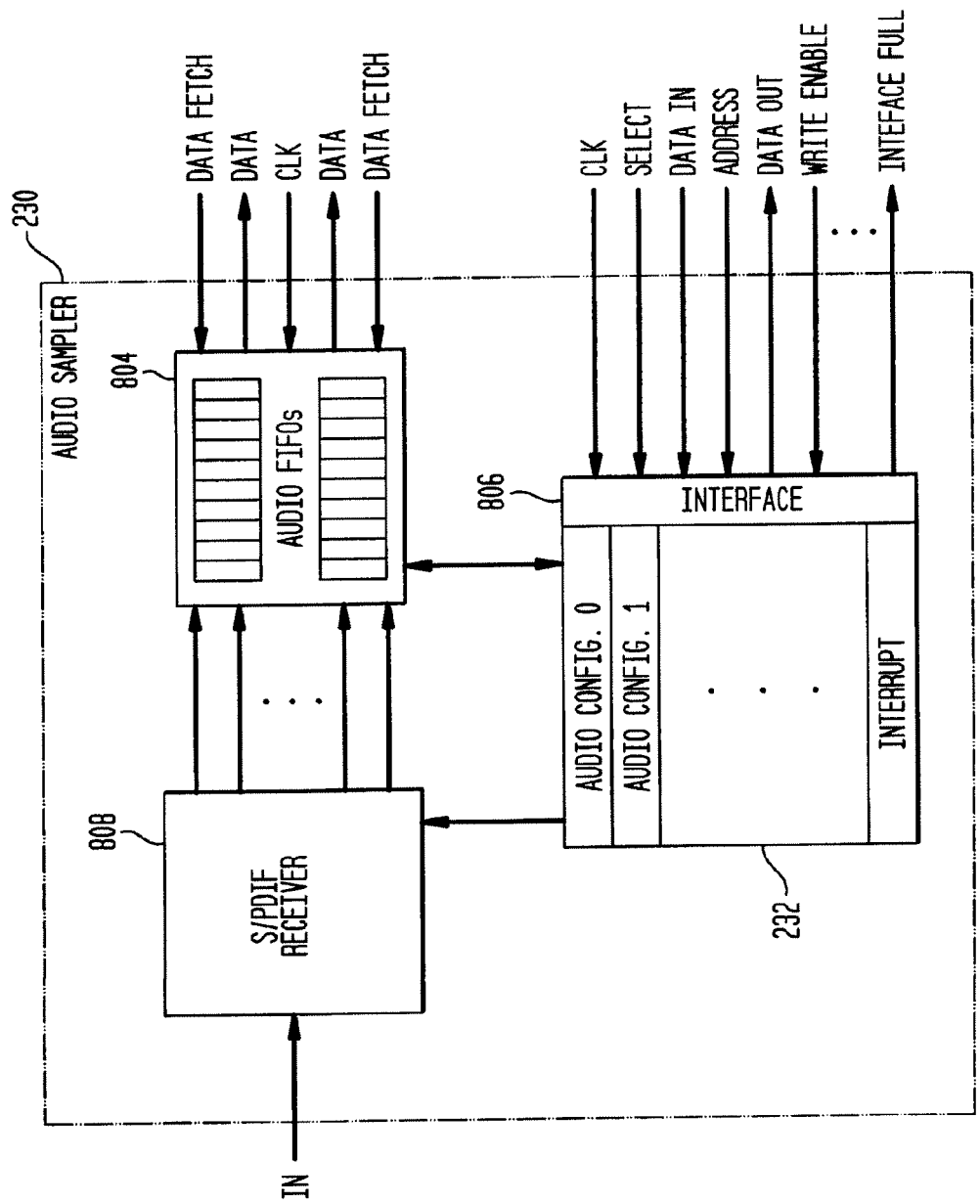
Figure 8C:
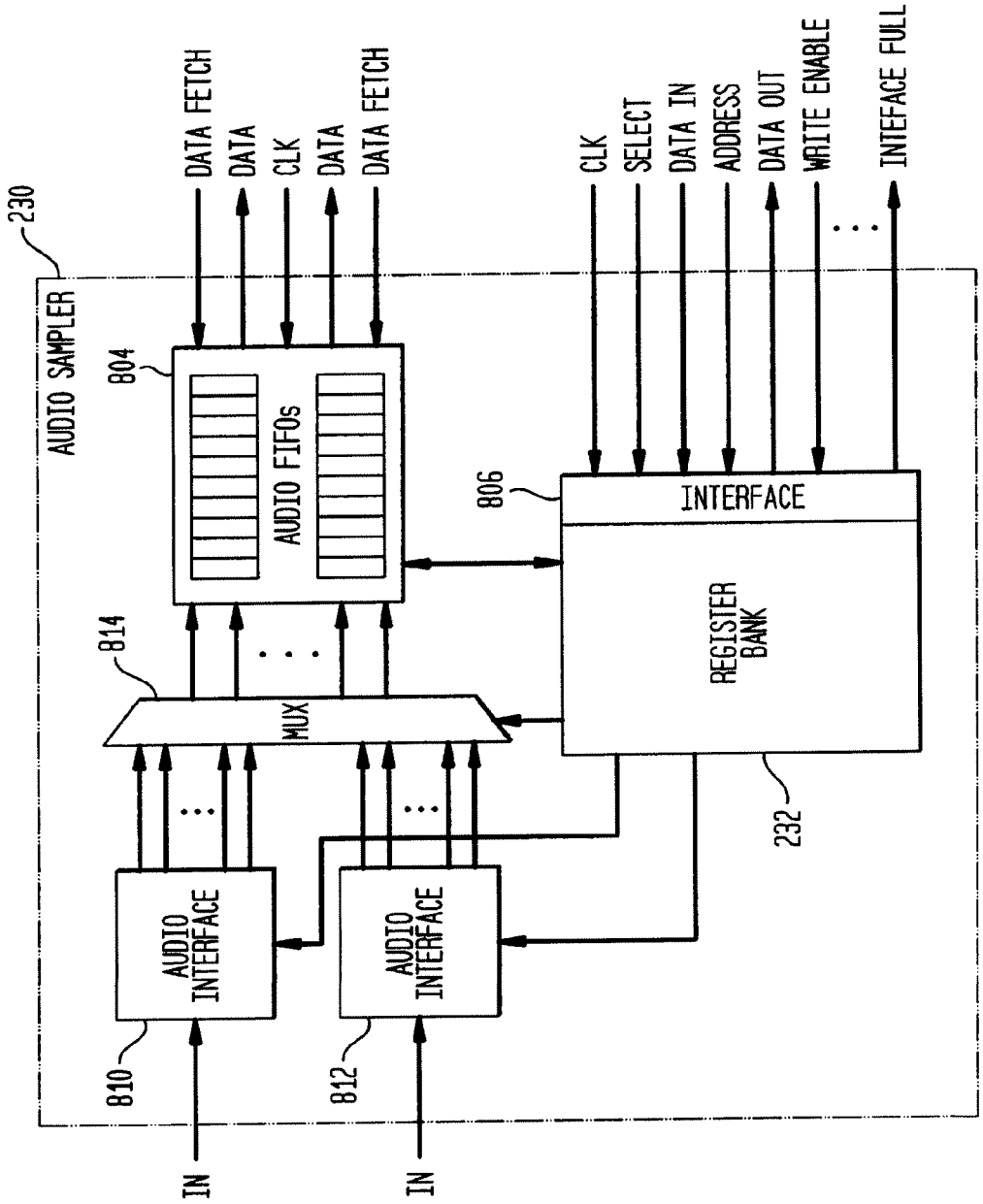

FIGS. 8A-C are diagrams of example audio samplers for the High-Definition Multimedia Interface transmitter controller of FIG. 2 according to an embodiment of the present invention.

Figure 9:
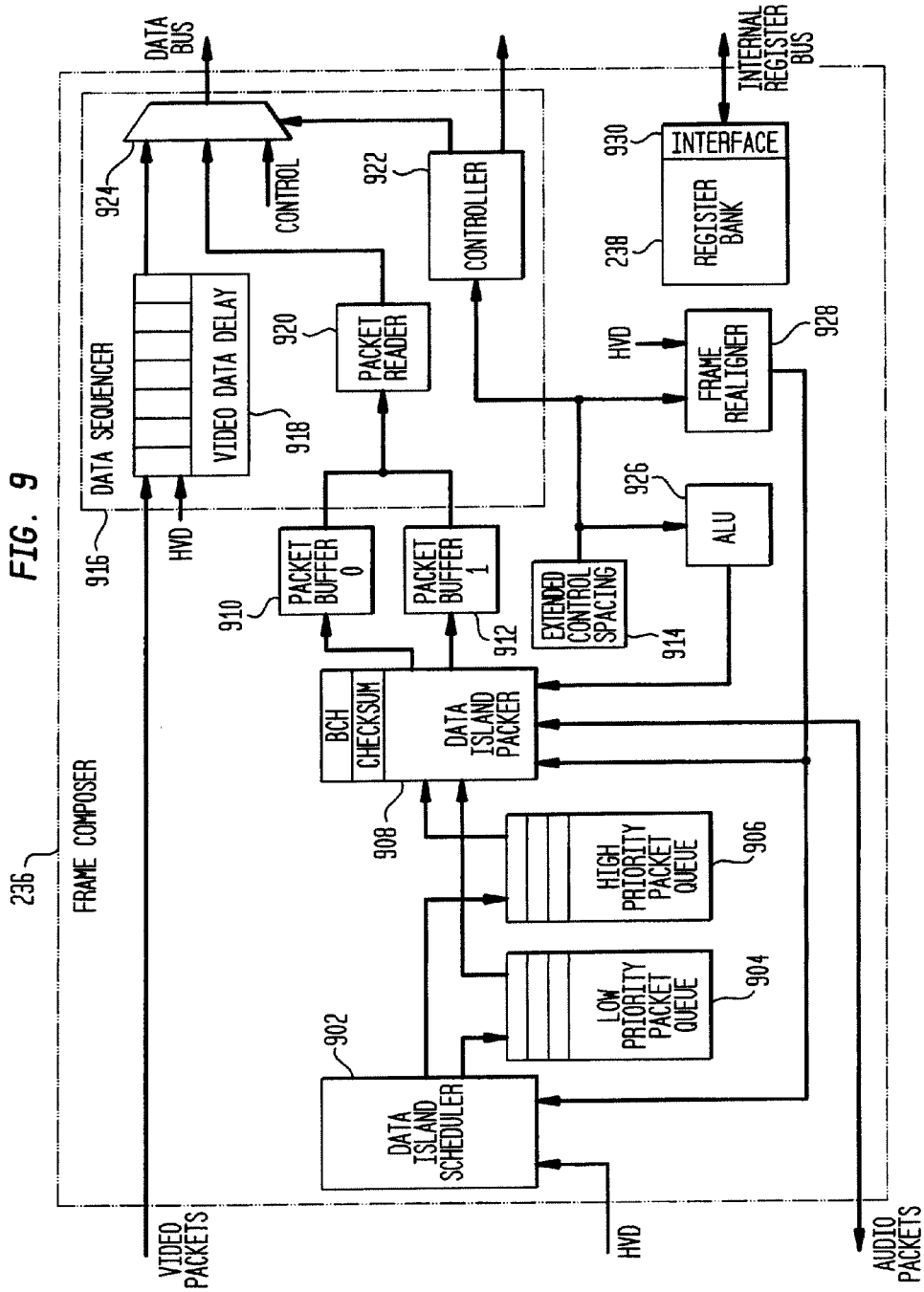

FIG. 9 is a diagram of an example frame composer for the High-Definition Multimedia Interface transmitter controller of FIG. 2 according to an embodiment of the present invention.

Figure 10:
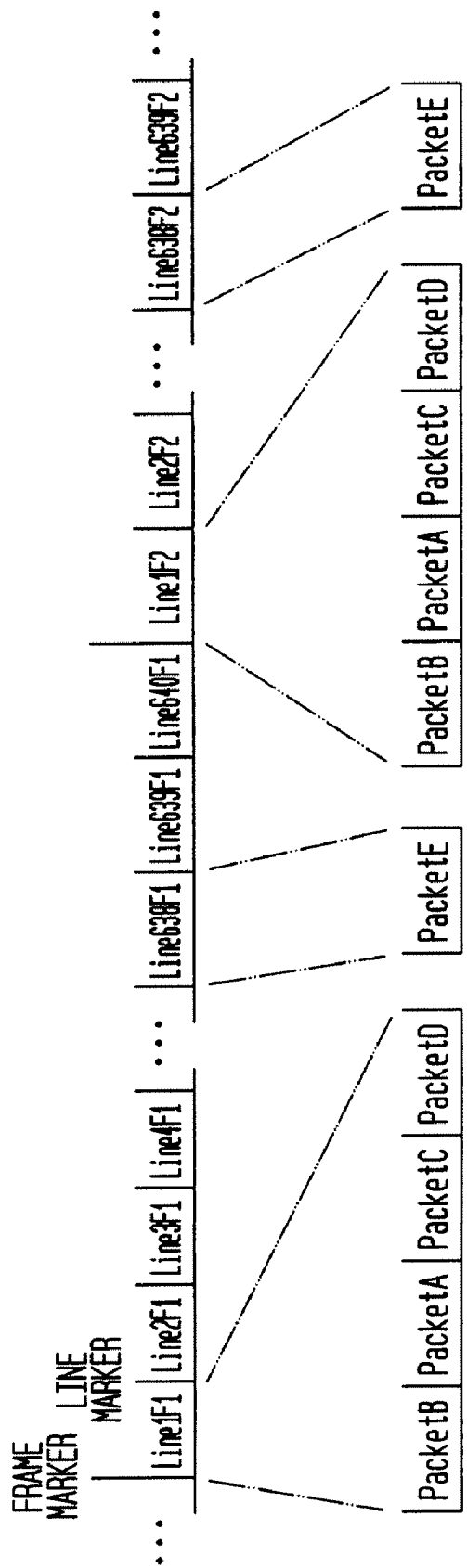

FIG. 10 is a diagram of a High-Definition Multimedia Interface signal that further illustrates the frame composer of FIG. 9.

Figure 11:
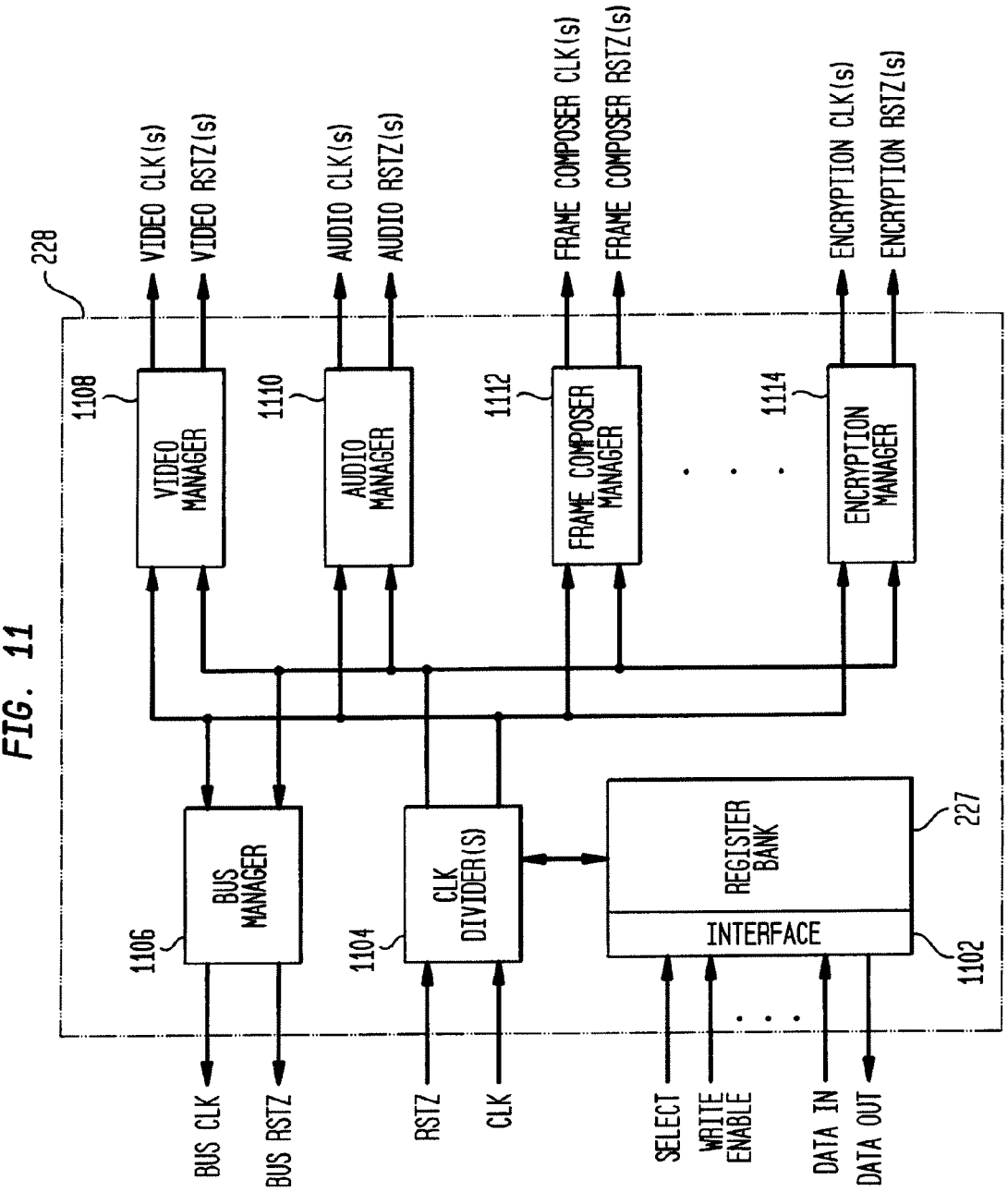

FIG. 11 is a diagram of an example power controller for the High-Definition Multimedia Interface transmitter controller of FIG. 2 according to an embodiment of the present invention.

The present invention is described with reference to the accompanying drawings. The drawing in which an element first appears is typically indicated by the leftmost digit or digits in the corresponding reference number.

DETAILED DESCRIPTION OF THE PRESENT INVENTION

The present invention provides a high definition media interface controller having a modular design internal bus structure, and applications thereof. In the detailed description of the present invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, a high definition media interface (HDMI) controller according to the present invention includes a circuit interface, an address decoder coupled to the circuit interface, a plurality of sub-circuits, wherein each sub-circuit includes registers used to configure and control the sub-circuit, and a bus that couples the registers of each sub-circuit to the address decoder. After startup (e.g., power-on or return from standby mode) of the HDMI controller, the sub-circuits are configured by using the circuit interface, address decoder, and bus to write values to the registers of the sub-circuits. This permits the HDMI controller to be configured for use with any of a wide variety of digital devices.

Figure 1:
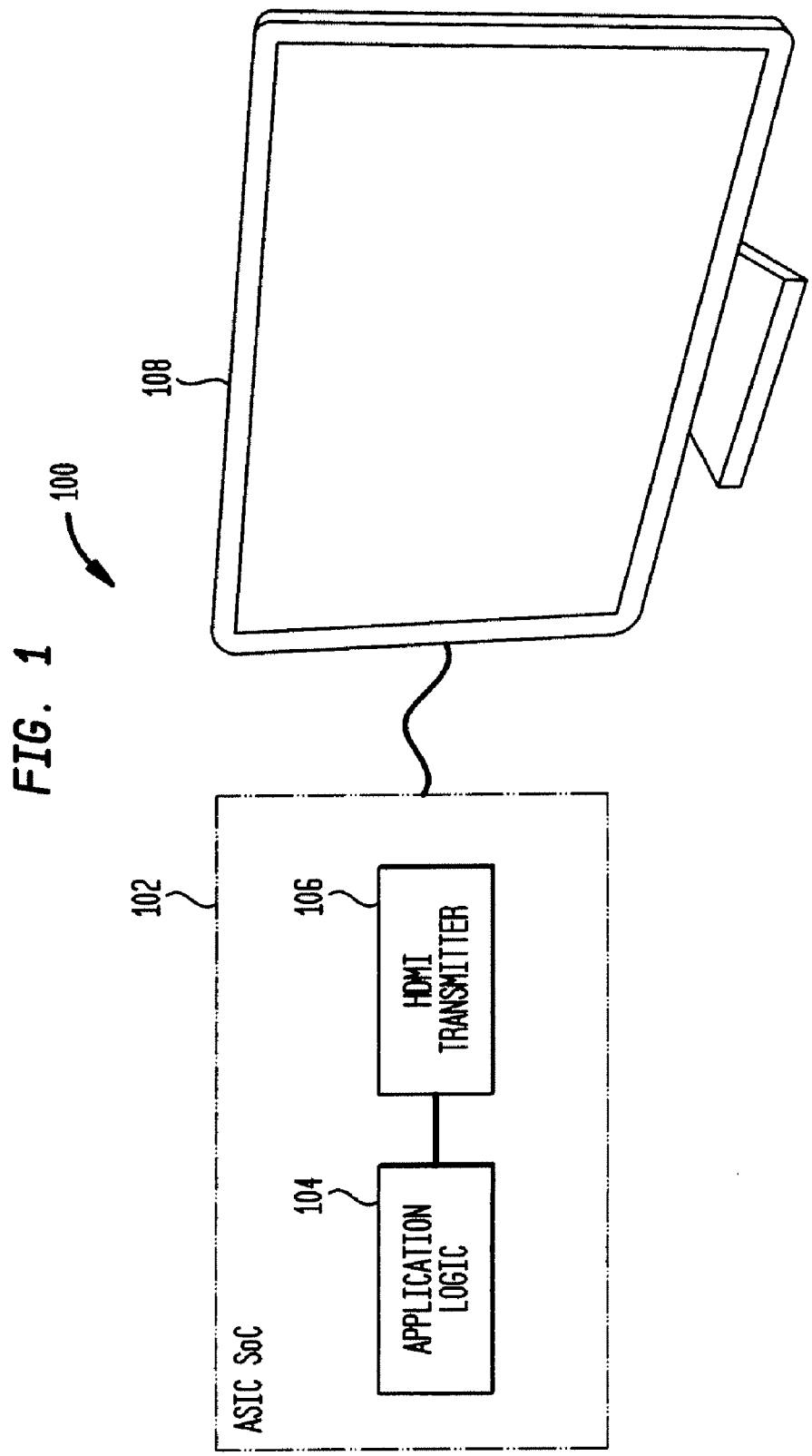
FIG. 1 is a diagram of an example digital system having an electrical circuit according to an embodiment of the present invention.

FIG. 1 is a diagram of an example digital system 100 having a high definition media interface (HDMI) controller according to an embodiment of the present invention. System 100 includes an application specific integrated circuit system on a chip (ASIC SoC) 102 and a high definition digital television 108. As shown in FIG. 1, ASIC SoC 102 has an application logic module 104 coupled to an HDMI transmitter 106. In embodiments of the present invention, ASIC SoC 102 can be any digital device such as, for example, a set-top box, a CD/DVD disc player, a personal computer, a video game console, or the like, as would become apparent to a person of ordinary skill in the art.

FIG. 2 is a more detailed diagram of HDMI transmitter (TX) 106 according to an embodiment of the present invention. HDMI transmitter 106 includes an HDMI transmitter controller 202 and an HDMI transmitter physical layer (PHY) 204. HDMI transmitter controller 202 includes a circuit configuration and control portion, a video processing portion, an audio processing portion, a frame composer portion, and an encryption portion. The circuit configuration and control portion includes a circuit interface 220, an address decoder 226, a power controller 228, a bus 266, and a PHY test interface 268. The video processing portion includes a video pixel sampler 206, a color space converter 210, a multiplexer 214, and a video packetizer 216. The audio processing portion includes an audio sampler 230, an audio packetizer 234 and a direct memory access (DMA) module 262. The frame composer portion includes frame composer 236. The encryption portion includes High-bandwidth Digital Content Protection (HDCP) encryptor 240, Enhanced Extended Display Identification Data (E-EDID)/HDCP arbiter 244, and interface module 248. Each of these components are described in detail below.

As shown in FIG. 2, in an embodiment, circuit interface 220 includes one or more interfaces for communications between components of HDMI transmitter controller 202 and other components, such as application logic 104 of system on a chip 102 via a bus system 280. These interfaces can include Inter-Integrated Circuit (I²C) interface 222 and Open Core Protocol (OCP) interface 224. I²C is a multi-master serial computer bus invented by Philips. OCP is a common standard for intellectual property core interfaces, or sockets, that facilitate "plug and play" SoC design. Other interfaces such as, for example, the Advanced Peripheral Bus (APB) and/or the Advanced High performance Bus (AHB) interfaces can also be included. In an embodiment, circuit interface 220 is used to write data stored in a memory external to controller 202 to a distributive internal register set of the controller, which is distributed throughout the controller as registers or register banks, such as registers 208, 212, 218, 227, 232, 235, 238, 242, 246, 260, and 270, for example.

Address decoder 226 and bus 266 are used to decode addresses received using circuit interface 220 and to facilitate the storage of data received in the internal register set of the controller. Using a distributed internal register set and a bus has advantages over the use of a centralized register bank and connecting lines because it eliminates, for example, a large number of connections that would be needed between a centralized register bank and sub-circuits of the controller. Address decoding is performed in a centralized block to allow flexibility for memory partitioning.

FIG. 3 illustrates an example address decoder for the HDMI transmitter controller 202 according to an embodiment of the present invention. As shown in FIG. 3, address decoder 226 includes an address enable decoder 302 and a data output module 304. Addresses received at interface circuit 220 (e.g., at I²C interface 222 and/or OCP interface 224) are provided to address enable decoder 302 and to bus 266. The output of address enable decoder 302 is a select signal that is provided to an appropriate sub-circuit of the controller. Data read returned from a sub-circuit of the controller is routed to another circuit by data output module 304 and circuit interface 220. As noted above, one of the events that occurs after startup of ASIC SoC 102 is that interface circuit 220 and address decoder 226 are used to write data from an external memory to the distributed internal register set of HDMI transmitter controller 106 to configure the controller. The types of configurations that can be implemented are described in more detail below.

Figure 4A:
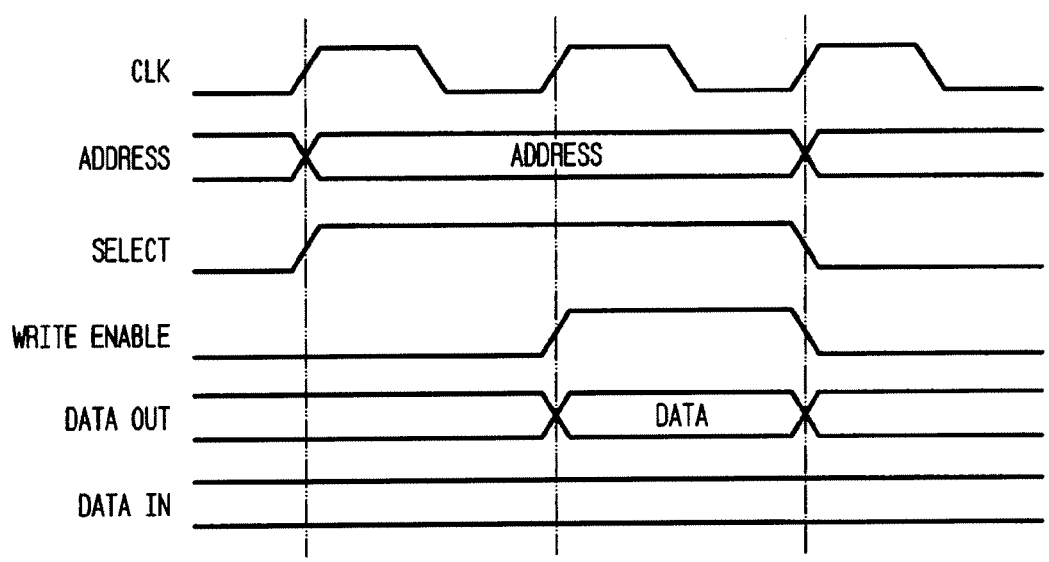
FIGS. 4A and 4B are timing diagrams that further illustrate the address decoder of FIG. 3.
Figure 4B:
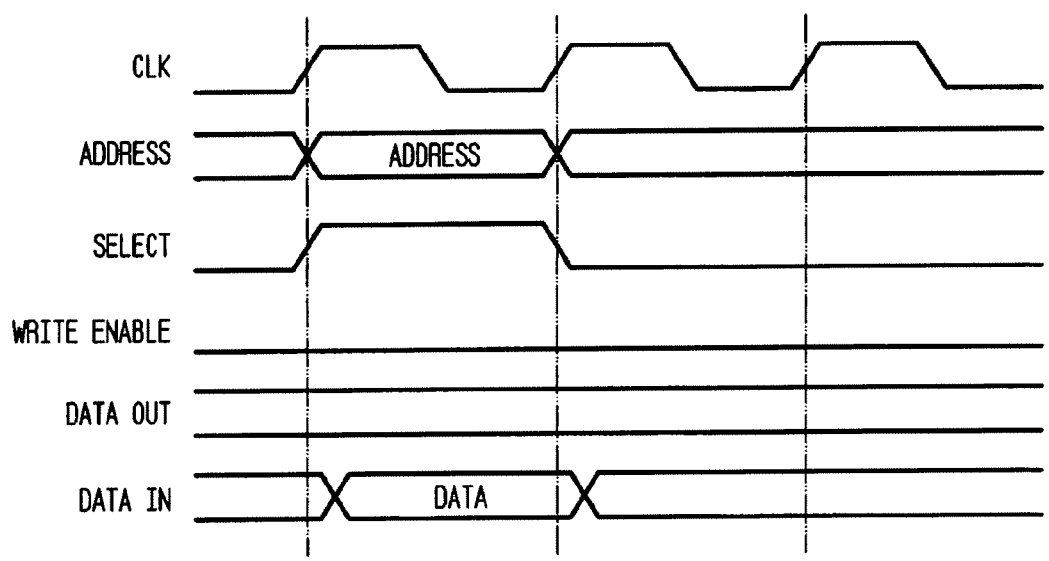

FIGS. 4A and 4B are timing diagrams that further illustrate how data is written to and read from the distributed internal register set of HDMI transmitter controller 202 according to an embodiment of the present invention.

Figure 5:
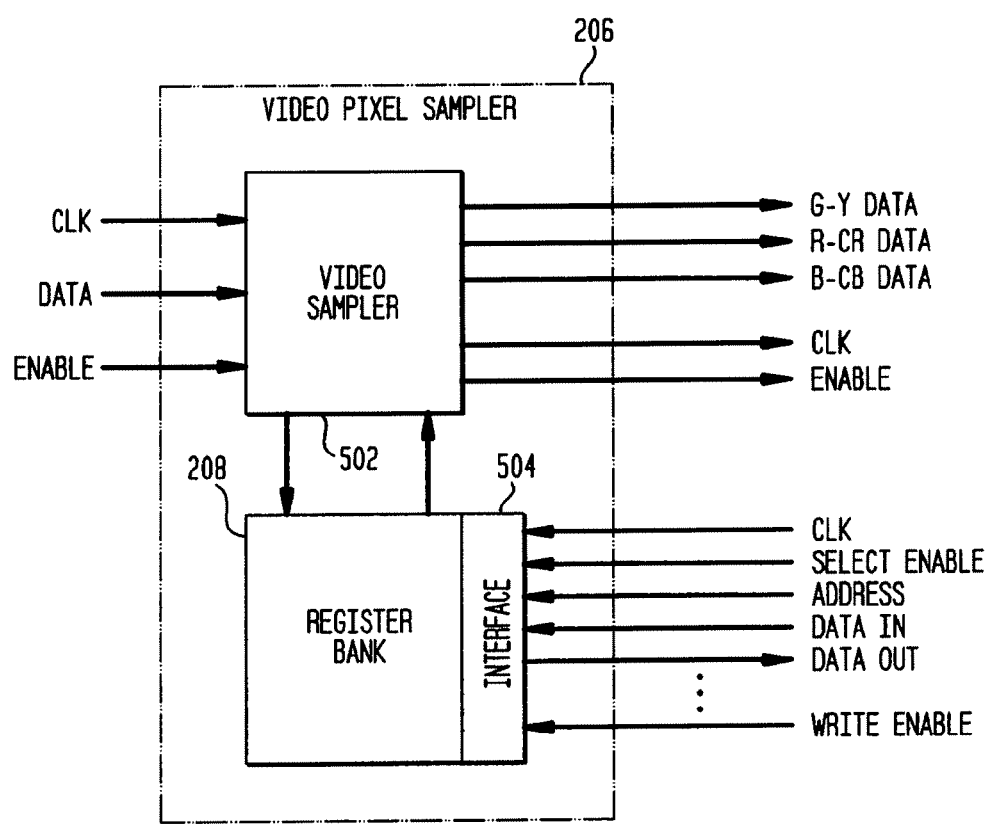
FIG. 5 is a diagram of an example video pixel sampler for the High-Definition Multimedia Interface transmitter controller of FIG. 2 according to an embodiment of the present invention.

FIG. 5 is a diagram of an example video pixel sampler 206 for HDMI transmitter controller 202 according to an embodiment of the present invention. Video pixel sampler 206 includes a video sampler 502, a register bank 208, and an interface 504 to bus 266.

Video pixel sampler 206 is responsible for the synchronization of video data. In an embodiment, video sampler 502 converts an input video format signal to a common format signal, which is understood and used by other sub-circuits of the controller. The common format signal can include a plurality of bits, such as 48 bits for example. Other data widths are possible.

Figure 6:
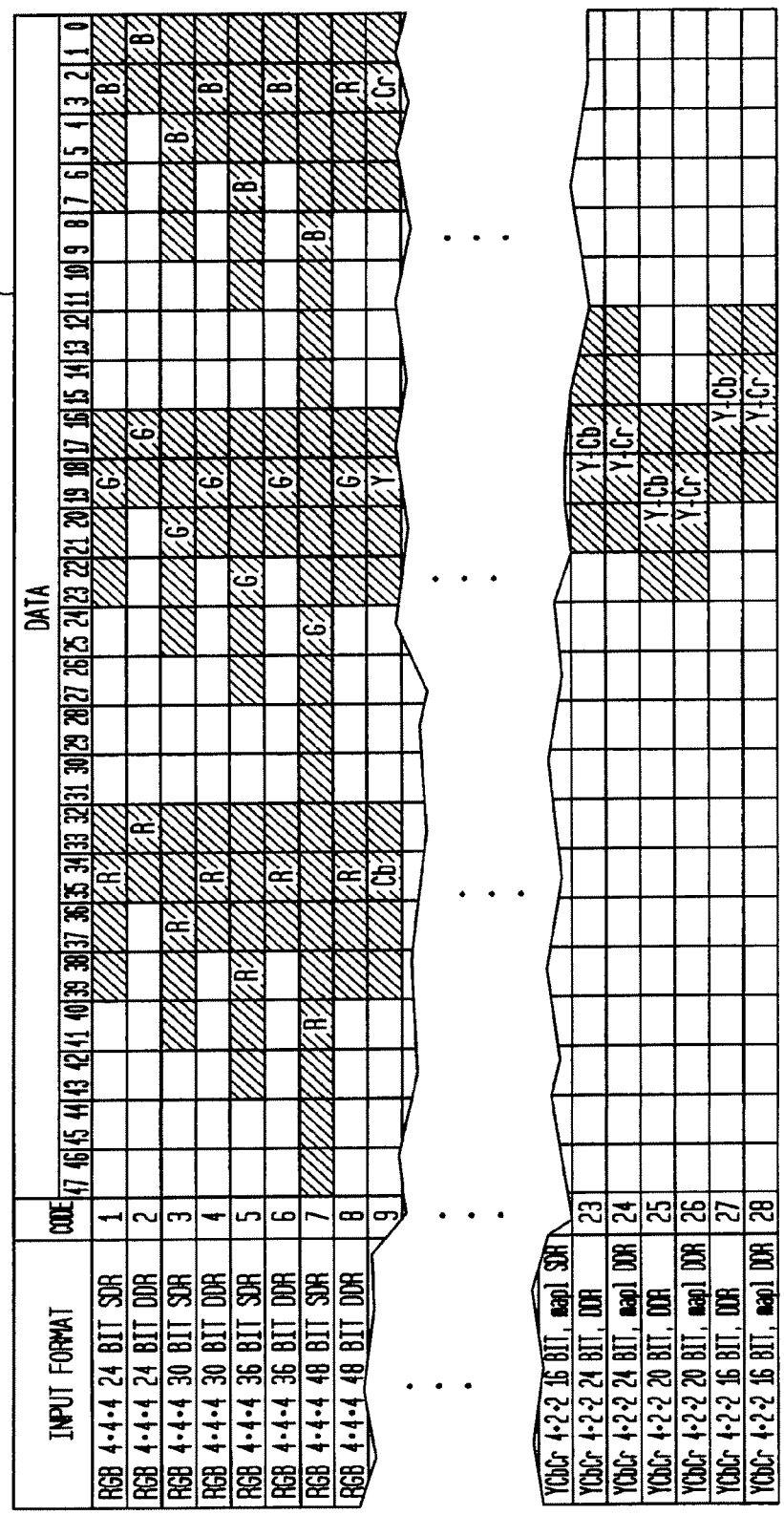
FIG. 6 is a diagram of a mapping table that further illustrates the video pixel sampler of FIG. 5.

FIG. 6 is an exemplary table 600 that illustrates the mapping of several input video format signals to the common format signal used in an embodiment by other sub-circuits of the controller. The mapping is different for video data having different color depths (Deep Color) and different format configuration. Various mappings are possible as would become apparent to persons skilled in the relevant art.

Referring to FIG. 5, in an embodiment, video sampler 502 can include a first-in first-out (FIFO) buffer for data rate accommodation. This may be the case, for example, if Double Data Rate (DDR) is required at the input.

Color space converter 210 is responsible for carrying out video color space conversion functions, such as: (i) RGB to/from YcbCr; (ii) 4:2:2 to/from 4:4:4 up (pixel repetition or linear interpolation)/down-converter; (iii) optional aspect ratio conversion (4:3 to/from 16:9); and (iv) optional limited to/from fall quantization range conversion. In an embodiment, the present invention supports all the timings reported in the Consumer Electronics Association (CEA) 861-D specification and the following pixel modes: (i) RGB444 and YCbCr444: 24, 30, 36 and 48 bits; and (ii) YCbCr422: 16, 20, and 24 bits.

Multiplexer 214 is used to pass either the output of video pixel sampler 206 and/or color space converter 210 to video packetizer 216.

Figure 7:
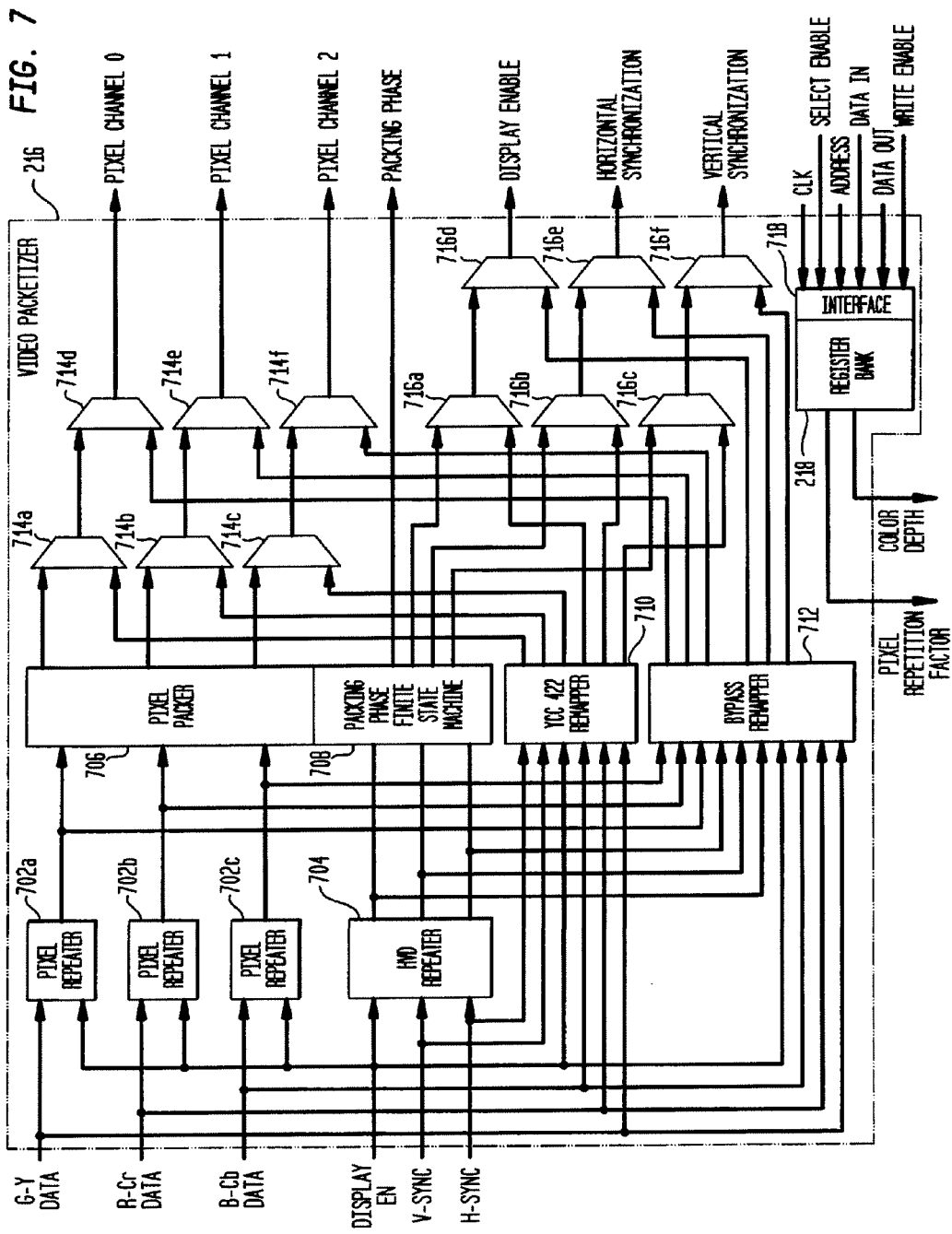
FIG. 7 is a diagram of an example video packetizer for the High-Definition Multimedia Interface transmitter controller of FIG. 2 according to an embodiment of the present invention.

FIG. 7 is a diagram of an example video packetizer 216 for HDMI transmitter controller 102 according to an embodiment of the present invention. As shown in FIG. 7, in an embodiment, video packetizer 216 includes pixel repeaters 702a-c, a horizontal synchronizer (H-Sync), vertical synchronizer (V-Sync), and display enable (Display En) (collectively HVD) repeater 704, a pixel packer 706 having a packing phase finite state machine 708, a YCC 422 remapper 710, a bypass remapper 712, a register bank 218 having an interface 718 to bus 266, and several multiplexers 714a-f and 716a-f.

Video packetizer 216 is used to perform pixel repetition if required, for example, because the available audio bandwidth is not sufficient to accommodate the required input audio stream. In an embodiment, video packetizer 216 is informed by configuration values stored in register bank 218 of the sampling rate of input audio and incoming video formats so that a determination can be made regarding whether pixel repetition is needed. If pixel repetition is performed, video packetizer 216 communicates to frame composer 236 the pixel packing phase and pixel repetition parameters used.

In an embodiment, video packetizer 216 is also responsible for deep color mode pixel packing according to a color depth configuration using a five byte FIFO buffer per video component.

Data output by video packetizer 216 may cross, for example, two clock domains. The first is when data is received at an input pixel clock and output at a multiple of the pixel clock (e.g., a pixel repetition clock ×1 to ×10 times input rate) given by the pixel repetition value used. The second clock domain happens when data either at pixel clock or pixel repetition clock is passed in to the symbol Transition Minimized Differential Signaling (TMDS) clock domain that is affected by a color depth (e.g., deep color mode, ×1, ×1.25, ×1.5 or ×2 input rate) configuration.

FIGS. 8A-C are diagrams of example audio samplers 230 for HDMI transmitter controller 202 according to embodiments of the present invention. As shown in FIG. 8A, in one embodiment, audio sampler 230 includes an Inter-IC Sound ($I^2S$) interface 802, audio FIFO buffers 804, and a set of registers or a register bank 232 having an interface 806 to bus 266. As shown in FIG. 8B, in one embodiment, audio sampler 230 has a Sony/Philips Digital Interconnect Format (S/PDIF) receiver 808 in lieu of $I^2S$ interface 802. In another embodiment, as illustrated by FIG. 8C, audio sampler 230 includes multiple audio interfaces such as, for example, audio interface 810 and audio interface 812, which have their outputs coupled to audio FIFO buffers 804 by a multiplexer 814.

Audio sampler 230 is responsible for audio data buffering. As noted above, audio sampler 230 can support several input audio standards as plug-ins. Audio sampler 230 accommodates audio stream rate to pixel frame rate by means of FIFO buffers 804.

In embodiments, in addition to supporting $I^2S$ and S/PDIF formats, audio sampler 230 also supports Parallel Audio (to capture audio data received, for example, from main system memory) and/or one-bit audio.

Audio packetizer 234 is responsible for determine the N/CTS values according to input audio stream characteristics and an output HDMI required stream. The N/CTS values are used in the sink Audio Clock Regeneration phase. In an embodiment, audio packetizer 234 is also responsible for composing audio related data island packets (except for their BCH error correction codes) according to the audio stream to be carried in the HDMI output stream. Supported and optional data island packets include: (i) Audio Clock Regeneration packets, which indicate to sink device the N/CTS values that should be used in the Audio Clock Regeneration process; (ii) Audio Content Protection (ACP) packets, which are used to convey content-related information about the active audio stream transmitted; (iii) Audio InfoFrame packets, which indicate characteristics of the active audio stream by using IEC 60958 channel status bits, IEC 61937 burst information and/or stream data (if present); (iv) Audio Sample packets, which transports L-PCM and IEC 61937 compressed audio; (v) One-bit Audio Sample packets, which transports one-bit audio streams; (vi) Direct Stream Transport Audio packets, which Transports DST audio streams; and (vii) High Bit-rate Audio Stream Packets, which transport compressed audio streams.

Several different strategies can be used to compose the content of ACP and Audio infoFrames. By using the different standard interfaces provided by controller 202, the controller can read the packet non-specific information (and complete internally the rest of the packet) from system memory (using the AMBA, AHB, DMA, or OCP interface) or from an external ROM (either by a dedicated or an $I^2C$ ROM interface).

DMA module 262 is intended for advanced systems running 32-bit microcontroller unit (MCU) system on a chip solutions. In embodiments, DMA module 262 provides a direct audio interface. This is useful in systems where audio processing is required to be carried out by a digital signal processor because it eliminates, for example, the overhead of converting between the several audio standards. In embodiments, DMA module 262 can be programmed to read from system memory EDID/HDCP keys and a revocation list and/ or to write E-EDID information directly to memory.

In an embodiment, instead of having register space to configure content of the supported data island packets, DMA module 262 can directly read from system memory the data island packets and warn the MCU when they are sent to the interface by means of an interrupt.

FIG. 9 is a diagram of an example frame composer 236 for HDMI transmitter controller 202 according to an embodiment of the present invention. In an embodiment, frame composer 236 includes a data island scheduler 902, a low priority packet queue 904, a high priority packet queue 906, a data island packer 908, packet buffers 910 and 912, an extended control spacing module 914, a data sequencer 916, an arithmetic logic unit (ALU) 926, a frame realigner 928, and a register bank 238 having an interface 930 to bus 266. Data sequencer 916 includes a video delay 918, a packet reader 920, a controller 922, and a multiplexer 924.

Frame composer 236 is responsible for assembling video, audio and data packets in a consistent frame that is streamed, for example, to HDCP encryptor 240 and to HDMI transmitter PHY 204. The HDMI standard describes in a precise way the packet distribution and insertion timing that must be obeyed in order to correctly compose an output HDMI TMDS stream. In this context, there are data island packets that are sent on data availability, others that are sent once per frame or once per two frames, and others that are sent on user request. Classification of typical packets according to this insertion timing is shown in Table 1 below.

TABLE 1

| Packet Type | Insertion Timing |
|---|---|
| Audio Clock Regeneration (ACR) packets | Sent on data availability |
| Audio Sample (AUDS) packets | Sent on data availability (precede ACR if present) |
| Audio Content Protection (ACP) packets | On user request or automatic insertion |
| Audio InfoFrame (AUDI) packets | Once per two frames |
| Null (NULL) Packets | On user request or automatic insertion to fill Data Island period |
| General Control (GCP) packets | Once per frame |
| International Standard Recording Code (ISCR1/ISCR2) packets (optional) | On user request |

TABLE 1-continued

| Packet Type | Insertion Timing |
| --- | --- |
| Vendor Specific (VSD) InfoFrame packets | On user request or automatic insertion |
| Source Data Product Descriptor (SPD) InfoFrame packet | On user request or automatic insertion |

Packet distribution is handled in frame composer 236 by data island scheduler 902. In an embodiment, data island scheduler 902 is a round-robin state machine able to schedule packet insertion according to an input video frame or line basis. Data island scheduler 902 is fully configurable and can schedule any packet type to be inserted at a given input video frame rate or input video line rate.

Data island scheduler 902 schedules packets to be inserted in the output HDMI stream by inserting packet descriptors in the corresponding packet priority queue (e.g., low priority packet queue 904 or high priority packet queue 906) according to packet priority classification. After the packet descriptors have been inserted in the packet priority queues, data island packer 908 is responsible for assembling and sequencing the packets for output HDMI stream insertion by data sequencer 916. Packet distribution throughout the frames data island periods depends on the type and number of packets to be sent in the correspondent frame. Distribution timing can vary depending if a packet is to be sent on data availability, once per frame, once per two frames, or user request.

In an embodiment, data island scheduler 902 can be configured to define the rate of packet distribution (except for AUDS and ACR packets), the relative initial delay for initial request, and the order in which packet requests are inserted into the packet queues.

In embodiments, as indicated above in Table 1, frame composer 236 supports composition of the following data island packets: (i) null packets, which are ignored by sink devices; (ii) general control packets, which indicate color depth, pixel packing phase and audio/visual mute information to sink device; (iii) International Standard Recording Code (ISCR1/ISCR2) packets; (iv) Vendor Specific InfoFrame packets, according to the Consumer Electronics Association (CEA) 861-D standard; (v) AVI infoFrame packets (video information from source to sink); (vi) source data product descriptor infoFrame packet (name and product type of the source device; and (vii) MPEG Source InfoFrame packets, which describe several aspects of the compressed video stream that where used to produce the uncompressed video. In an embodiment, the BCH error correction codes, parity codes, and infoFrames checksums for data islands packets are generated by dedicated error correction code generators and checksum byte-wide sum hardware.

Several different strategies can be implemented to compose the content of GCP, ISCR1/2, VSD, AVI, SPD and MPEG packets. By using the different standard interfaces provided by the controller, the controller can read the packet non-specific information and complete the rest of the packet from system memory (e.g., using circuit interface 220 or DMA module 262) or from an external read-only memory (ROM) (e.g., either by a dedicated or an I$^2$C ROM interface).

FIG. 10 is a diagram of an HDMI signal that further illustrates the operation of frame composer 236.

In an embodiment, HDMI transmitter controller 202 includes an optional encryption portion that comprises HDCP encryptor 240, E-EDID/HDCP Arbiter 244, interface module 248 and I$^2$C modules 252 and 260. This encryption portion is used to implement HDCP functionality. HDCP encryptor 240 implements the three layers of the HDCP cipher, including LFSR and other functions required to generate the encryption bytes that are XORed with the data. In order to perform the authentication steps of the HDCP protocol, a set of registers 242 and interrupts are available to be used by software running in HDCP encryptor 240. This enables HDCP encryptor 240 to comply with the HDCP authentication protocol. Audio/visual mute capabilities are also implemented in embodiments. HDCP keys such as key 250 and revocation list(s) can be read from external ROM either by a dedicated interface such as interface 248 or by an optional I$^2$C dedicated interface. No HDMI data processing is done at this stage, and data coming in and out remains unprocessed. Only the encryption function is implemented.

In an embodiment, the display data channel is a dedicated I$^2$C master interface that allows the read of sink E-EDID based on system needs. Data read from sink E-EDID can be transferred through the standard implemented interfaces (e.g., AMBA, AHB, DMA, OCP, I$^2$C or dedicated ROM interface) to either system memory or external ROM.

E-EDID/HDCP arbiter 244 is responsible for reading the E-EDID (and all associated segments according to a user configuration) and after completion give an indication of the data availability.

FIG. 11 is a diagram of an example power controller 228 for HDMI transmitter controller 202 according to an embodiment of the present invention. Power controller 228 includes a bank of registers 227 with an interface 1102 to bus 266, clock divider(s) 1104, a bus manager 1106, a video manager 1108, an audio manager 1110, a frame composer manager 112, an encryption manager 1114, and the like.

Power controller 228 manages power consumption by the various sub-circuits of the controller. For example, when the video channel of HDMI transmitter controller is not being used, the non-use is detected by video manager 1108 and sub-circuits associated with the video channel will be powered down (e.g., to a standby mode). The same will happen, for example, if the audio channel or selected interfaces of the audio channel are not being used. Audio manager 1110 detects the non-use and powers down sub-circuits that are not presently needed in order to save energy. In an embodiment, power controller 228 implements several flexible clock gating power management strategies.

As described herein, HDMI transmitter controller 202 has several clock domains. In some of these clock domains, intensive data handling involving, for example, video and audio is performed. One of the power management strategies implemented by power controller 228 is an ability to perform all clock and reset handling centrally. This power management strategy allows for an easily upgradeable path for different power management strategies (e.g., clock gating and voltage island approach). Other features include software reset flexibility per clock domain and bus clock rate control.

As illustrated by FIG. 11, power manager 228 can power down individual clock domains by disabling the associated clock and activating the associated reset. Power controller 228 synchronizes the reset signal with a particular clock domain before connecting it to the module(s) that use it. In an embodiment, power controller 228 can perform a software reset of each reset domain. These requests are received via the register configuration.

In an embodiment, the bus clock is generated by programmable division (e.g., in a range from 0 to 15) of a selected input clock. The resulting clock is distributed to all other modules. This allows register bank 227 to work at a lower frequency, for example, than the video pixel clock frequency.

In an embodiment, power controller 228 implements the clock gating power management strategies listed below in Table 2.

TABLE 2

| Power Management Mode | Enter | Action | Exit |
|---|---|---|---|
| Power Down (PD) | By asserting low on active low power down input signal | Shutdown all sub-circuits of HDMI transmitter controller; No output video on TMDS interface; No input scanning by video or Audio interfaces. | By asserting high power down signal; After leaving this state, a reset is needed for correct operation; Reset action is automatically performed or optionally controlled by a user with a active low reset signal |
| Stand By (SB) | If no activity is present on a data enable input for more than 100 ms | Output on TMDS interface 24-bit blue screen video without any audio; HDCP encryptor, color space converter, audio sampler and audio packetizer are powered off | Upon activity on data enable signal; Reset to power up modules is automatically generated |
| Feed Through (FT) | By register configuration | Color space converter is powered off; Optionally HDCP encryptor can be powered off | By register configuration; Reset to power up modules is automatically generated |
| HDCP Power Down (HDCP) | By register configuration | HDCP encryptor is powered off | By register configuration; Reset to HDCP encryptor is automatically generated |

PHY test interface 268 is used to test HDMI transmitter PHY 204. As shown in FIG. 2, PHY test interface 268 includes a plurality of registers 270 that can be accessed using circuit interface 220, address decoder 226 and bus 266.

HDMI transmitter PHY 204 encodes the digital output of HDMI transmitter controller 202 on an analog carrier signal and transmits it, for example, to digital television 108.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, SystemC Register Transfer Level (RTL), and so on, or other available programs. Such software can be disposed in any known computer usable medium such as semiconductor, magnetic disk, optical disk (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing an apparatus described herein by providing software describing the apparatus and subsequently transmitting the software as a computer data signal over a communication network including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and method embodiments described herein may be embodied as a combination of hardware and software. Thus, the present invention should not be limited by any of the above-described exemplary embodiments, but should be defined only in accordance with the following claims and their equivalence. Furthermore, it should be appreciated that the detailed description of the present invention provided herein, and not the summary and abstract sections, is intended to be used to interpret the claims. The summary and abstract sections may set forth one or more but not all exemplary embodiments of the present invention.

The invention claimed is:

1. A method for transmitting a High-Definition Multimedia Interface (HDMI) signal, the method comprising:
    when in a transmit mode:
        converting an input video signal to a common format signal used by a plurality of sub-circuits of an electronic circuit;
        packing pixels of the common format signal for transmission; and transmitting packed pixels as part of an HDMI signal and
    when in a standby mode:

powering down an individual clock domain of a sub-circuit, which includes:
disabling an associated clock of the sub-circuit;
activating an associated reset signal of the sub-circuit; and
synchronizing the associated reset signal with a particular clock domain before connecting it to the sub-circuit.

2. The method of claim 1, further comprising:
configuring the plurality of sub-circuits using values stored by the plurality of sub-circuits.

3. The method of claim 1, wherein converting includes mapping based on at least one of color depth and format configuration.

4. The method of claim 1, wherein converting includes buffering for data rate accommodation.

5. The method of claim 1, further comprising:
performing at least one video color space conversion function on the common format signal to generate a converted signal; and
selectively packing pixels of one of the common format signal and the converted signal for transmission.

6. The method of claim 1, wherein packing pixels includes pixel repetition.

7. The method of claim 6, wherein pixel repetition is based on a known sampling rate of input audio and an incoming video format.

8. The method of claim 1, wherein packing pixels includes deep color mode pixel packing.

9. The method of claim 1, wherein packing pixels includes receiving the common format signal at an input pixel clock and outputting packed pixels at a multiple of the pixel clock based on a pixel repetition value.

10. The method of claim 1, further including:
buffering audio data; and
forming audio packets from buffered audio data for transmission with the HDMI signal.

11. The method of claim 10, wherein buffering audio data includes first-in-first-out buffering to accommodate audio stream rate to pixel frame rate.

12. The method of claim 10, packing the audio data includes composing audio related data island packets.

13. The method of claim 1, further comprising:
forming audio packets from audio data retrieved from a memory using a direct memory access interface; and
transmitting the audio packets as part of the HDMI signal.

14. The method of claim 1, further comprising:
composing frames for streaming, the frames including the packed pixels.

15. The method of claim 14, wherein the frames further include at least one of audio packets and data packets.

16. The method of claim 15, further including encrypting the frames in accordance with an authentication protocol.

17. The method of claim 1, further including powering down at least one sub-circuit when non-use is detected.

18. The method of claim 1, further including performing clock and reset handling for the plurality of sub-circuits centrally.

19. The method of claim 1, further including performing clock gating power management for the plurality of sub-circuits.

* * * * *

UNITED STATES PATENT AND TRADEMARK OFFICE
CERTIFICATE OF CORRECTION

PATENT NO. : 8,195,843 B2  Page 1 of 1
APPLICATION NO. : 12/898631
DATED : June 5, 2012
INVENTOR(S) : Almeida et al.

It is certified that error appears in the above-identified patent and that said Letters Patent is hereby corrected as shown below:

In the Claims

<u>Column 10</u>
Line 65, Claim 1, amend "an" to --the--.

<u>Column 11</u>
Line 10, Claim 3, insert --the-- before "converting".
Line 13, Claim 4, insert --the-- before "converting".
Line 21, Claim 6, insert --the-- before "packing".
Line 23, Claim 7, insert --the-- before "pixel repetition".
Line 26, Claim 8, insert --the-- before "packing pixels".
Line 28, Claim 9, insert --the-- before "packing pixels".
Line 30, Claim 9, insert --the-- before "packed".
Line 30, Claim 9, insert --input-- before "pixel clock".

<u>Column 12</u>
Line 5, Claim 11, insert --the-- before "buffering".
Line 8, Claim 12, amend "packing the audio data" to --wherein the forming audio packets--.

Signed and Sealed this
Eighteenth Day of February, 2014

Michelle K. Lee
*Deputy Director of the United States Patent and Trademark Office*